United States Patent
Kasza

(10) Patent No.: US 12,041,088 B2
(45) Date of Patent: Jul. 16, 2024

(54) SYSTEM AND METHOD FOR IDENTIFYING AUTHENTICATION METHOD OF SECURE SHELL (SSH) SESSIONS

(71) Applicant: Corelight, Inc., San Francisco, CA (US)

(72) Inventor: Anthony Kasza, San Francisco, CA (US)

(73) Assignee: CORELIGHT, INC., San Francisco, CA (US)

( * ) Notice: Subject to any disclaimer, the term of this patent is extended or adjusted under 35 U.S.C. 154(b) by 547 days.

(21) Appl. No.: 17/211,672

(22) Filed: Mar. 24, 2021

(65) Prior Publication Data

US 2022/0311801 A1    Sep. 29, 2022

(51) Int. Cl.
*H04L 9/40* (2022.01)
(52) U.S. Cl.
CPC .................. *H04L 63/168* (2013.01)
(58) Field of Classification Search
CPC .............................. H04L 63/16; H04L 63/168
See application file for complete search history.

(56) References Cited

U.S. PATENT DOCUMENTS

| | | | |
|---|---|---|---|
| 5,870,399 A | 2/1999 | Smith | |
| 8,056,129 B2 | 11/2011 | Gusler | |
| 9,473,380 B1 | 10/2016 | Bermudez et al. | |
| 10,104,207 B1 | 10/2018 | Rougier | |
| 10,135,847 B2 | 11/2018 | Althouse et al. | |
| 10,200,259 B1 | 2/2019 | Pukish et al. | |
| 10,326,789 B1 | 6/2019 | Vines | |
| 11,165,675 B1 | 11/2021 | Piet | |
| 11,436,310 B1 | 9/2022 | Tengalia | |
| 2009/0197681 A1 | 8/2009 | Krishnannoorthy et al. | |
| 2011/0173198 A1 | 7/2011 | Malleshaiah et al. | |
| 2011/0320816 A1 | 12/2011 | Yao | |
| 2014/0019609 A1 | 1/2014 | Williams et al. | |
| 2015/0215429 A1 | 7/2015 | Weisblum et al. | |
| 2015/0256528 A1 | 9/2015 | Turgeman | |
| 2017/0076256 A1 | 3/2017 | Castel et al. | |
| 2017/0093675 A1 | 3/2017 | Chuang et al. | |
| 2019/0356564 A1 | 11/2019 | Kaneko et al. | |
| 2020/0028771 A1 | 1/2020 | Wong et al. | |
| 2020/0210871 A1 | 7/2020 | Alperovich et al. | |

(Continued)

OTHER PUBLICATIONS

Draper-Gil et al.; "Characterization of Encrypted and VPN Traffic using Time-related Features", Proceedings of the 2nd International Conference on Information Systems Security and Privacy (ICISSP 2016), Conference Paper dated Feb. 2016, pp. 407-414, 9 pages.

(Continued)

*Primary Examiner* — Daniel B Potratz
(74) *Attorney, Agent, or Firm* — Manatt, Phelps & Phillips, LLP

(57) ABSTRACT

A system and method for inferring a secure shell (SSH) authentication method from SSH session data traffic overcomes the problems with host logs. In one embodiment, the SSH authentication method may be inferred using a sensor appliance. In one embodiment, the SSH data traffic is encoded in a vector, one or more communication patterns are identified in the vector and the SSH authentication method is inferred from the one or more communication patterns.

25 Claims, 15 Drawing Sheets

(56) References Cited

U.S. PATENT DOCUMENTS

| | | | | |
|---|---|---|---|---|
| 2020/0322378 | A1* | 10/2020 | Yang | H04L 63/1408 |
| 2020/0351191 | A1 | 11/2020 | Lin et al. | |
| 2020/0389469 | A1 | 12/2020 | Litichever et al. | |
| 2021/0105304 | A1 | 4/2021 | Kraning et al. | |
| 2021/0117775 | A1* | 4/2021 | Zlotnick | G06F 18/2431 |
| 2021/0185066 | A1 | 6/2021 | Shah et al. | |
| 2021/0282016 | A1* | 9/2021 | Mohan | H04L 63/1458 |
| 2021/0288960 | A1* | 9/2021 | Nickolai | H04L 63/0884 |

OTHER PUBLICATIONS

Niemczyk et al.; "Identification over encrypted Channels", HP DVLabs, Jul. 1, 2014, 12 pages. https://raw.githubusercontent.com/bniemczyk/pacumen/master/paper/pacumen.pdf.

GGFAST: A General Framework for Building Network Traffic Classifiers, ACM SIGCOMM 2021, 16 pages.

Yuan et al.; "An SVM-based machine learning method for accurate internet traffic classification", Springer Science + Business Media, LLC 2008, 8 pages.

Zander et al.; "Automated Traffic Classification and Application Identification using Machine Learning", Centre for Advanced Internet Architectures Swinburne University of Technology, Melbourne, Australia, Proceedings of the IEEE Conference on Local Computer Networks 30th Anniversary (LCN'05), 2005 IEEE, 8 pages.

Wang et al.; "Unknown Pattern Extraction for Statistical Network Protocol Identification", School of Information Technology, Deakin University, Melbourne, Australia, 40th Annual IEEE Conference on Local Computer Networks, LCN 2015, downloaded on Mar. 2, 2021, 4 pages.

Lin et al.; "Application classification using packet size distribution and port association", Journal of Network and Computer Applications, Elsevier Ltd., Received Nov. 7, 2007, Received in revised form Mar. 3, 2009, Accepted Mar. 3, 2009, 8 pages.

Bernaille et al.; "Traffic classification on the fly", Universite' Pierre et Marie Curie—Paris VI, Thomson Paris Lab, Computer Communication Review, Association for Computing Machinery, 2006, 36 (2), pp. 23-26., 10.1145/1129582.1129589, hal-01097551, submitted on Dec. 19, 2014, 5 pages.

Dhamankar et al.; "Protocol Identification via Statistical Analysis (PISA)", Black Hat 2007, Tipping Point Technologies, 9 pages.

Karagiannis et al.; "BLINC: Multilevel Traffic Classification in the Dark", SIGCOMM'05, Aug. 21-26, 2005, Philadelphia, Pennsylvania, USA, 12 pages.

Auld et al.; "Bayesian Neural Networks for Internet Traffic Classification", IEEE Transactions on Neural Network, vol. 18, No. 1, Jan. 2007, 18 pages.

Bernaille et al.; "Early Application Identification", Universite' Pierre et Marie Curie—LIP6, CNRS Paris, France, CONEXT '06 Lisboa, Portugal, 12 pages.

McGregor et al.; "Flow Clustering Using Machine Learning Techniques", The University of Waikato, Private BAG 3105, Hamilton, New Zealand and The National Laboratory of Applied Network Research (NLANR), San Diego Supercomputer Center, University of California San Diego, 10100 Hopkins Drive, CA92186-0505, USA, Conference Paper in Lecture Notes in Computer Science • Apr. 2004, DOI: 10.1007/978-3-540-24668-8 21 • Source: DBLP, 11 pages.

Este et al.; "Support Vector Machines for TCP Traffic Classification", DEA, Università degli Studi di Brescia, via Branze, 38, 25123 Brescia, Italy, preprint submitted to Computer Networks, May 12, 2009, 32 pages.

Areström et al.; "Early Online Classification of Encrypted Traffic Streams using Multi-fractal Features", Linköping University, Sweden, The definitive version is published in Proc. IEEE INFOCOM Workshop on Intelligent Cloud Computing and Networking (IEEE ICCN @INFOCOM), Paris, France, Apr./May 2019, and is available at IEEE Xplore Digital Library via http://dx.doi.org/[doi], 6 pages.

Iliofotou et al.; "Network Monitoring using Traffic Dispersion Graphs (TDGs)", IMC'07, Oct. 24-26, 2007, San Diego, California, USA, 6 pages.

Moore et al.; "Internet Traffic Classification Using Bayesian Analysis Techniques", IGMETRICS'05, Jun. 6-10, 2005, Banff, Alberta, Canada, 11 pages.

Crotti et al.; "Traffic Classification through Simple Statistical Fingerprinting", DEA, Università degli Studi di Brescia, Italy, ACM SIGCOMM Computer Communication Review, vol. 37, No. 1, Jan. 2007, 10 pages.

Roughan et al.; "Class-of-Service Mapping for QoS: A Statistical Signature-based Approach to IP Traffic Classification", School of Mathematical Sciences, University of Adelaide, SA 5005, Australia and AT&T Labs—Research, Florham Park, NJ 07932-0971, USA, IMC'04, Oct. 25-27, 2004, Taormina, Sicily, Italy, 14 pages.

Anderson et al.; "Machine Learning for Encrypted Malware Traffic Classification: Accounting for Noisy Labels and Non-Stationarity", Cisco Systems, Inc., KDD 2017 Applied Data Science Paper, KDD'17, Aug. 13-17, 2017, Halifax, NS, Canada, 10 pages. DOI: http://dx.doi.org/10.1145/3097983.3098163.

Alizadeh et al.; "Timely Classification and Verification of Network Traffic Using Gaussian Mixture Models", Article in IEEE Access, Jan. 2020, Received Mar. 18, 2020, accepted Apr. 10, 2020, date of publication May 6, 2020, date of current version May 28, 2020, 17 pages. DOI: 10.1109/ACCESS.2020.2992556.

Moore et al.; "Toward the Accurate Identification of Network Applications", University of Cambridge and Intel Research, Cambridge, Conference Paper in Lecture Notes in Computer Science, Mar. 2005, 15 pages. (Source: DBLP) DOI: 10.1007/978-3-540-31966-5_4.

Qin et al.; "Towards a Profiling View for Unsupervised Traffic Classification by Exploring the Statistic Features and Link Pattern", NetAI '19, Aug. 23, 2019, Beijing, China. © 2019 Association for Computing Machinery, ACM ISBN 978-1-4503-6872-8/19/0 https://doi.org/10.1145/3341216.3342213.

Wright et al.; "Using Visual Motifs to Classify Encrypted Traffic", Johns Hopkins University Information Security Institute Baltimore, MD 21218, VizSEC'06, Nov. 3, 2006, Alexandria, Virginia, USA, 10 pages.

Lu et al.; "High performance traffic classification based on message size sequence and distribution", Journal of Network and Computer Applications 76 (2016) 60-74, © 2016 Elsevier Ltd., Accepted Sep. 29, 2016Available online Oct. 15, 2016, 15 pages. http://dx.doi.org/10.1016/j.jnca.2016.09.013.

Shim et al.; "Application Traffic Classification using Payload Size Sequence Signature", Department of Computer and Information Science, Korea University, Sejong, South Korea, International Journal of Network Management, received Aug. 9, 2016, revised Mar. 6, 2017, Accepted Apr. 24, 2017, 17 pages. DOI: 10.1002/nem.1981.

Corelight Blog, "Databricks = Corelight—A powerful combination for cybersecurity, incident response and threat hunting", Jul. 18, 2018, 41 pages.

TaoSecurity Blog, "Port Independent Protocol Identification", Sep. 7, 2006, 11 pages.

Gianvecchio et al., "Measurement and Classification of Humans and Bots in Internet Chat", The College of William and Mary, Dept. of Computer Science, Dec. 1, 2008, https://www.usenix.org/legacy/event/sec08/tech/full_papers/gianvecchio/gianvecchio_html/index.html (Year: 2008), 15 pages.

Suchacka et al., "Identifying Legitimate Web Users and Bots with Different Traffic Profiles—an Information Bottleneck Approach"—V Science Direct, Knowledge-Based Systems, Jun. 7, 2020, 18 pages.

Hernandez-Campos et al.; "Statistical Clustering of Internet Communication Patterns", Department of Statistics, University of North Carolina at Chapel Hill, Proceedings of the 35th Symposium on the Interface of Computing Science and Statistics, pp. 1-16 (2003), 16 pages.

Xie et al.; "SubFlow: Towards Practical Flow-Level Traffic Classification", University of California Riverside and Narus, Inc., The 31st Annual IEEE International Conference on Computer Communications: Mini-Conference, (2012), 5 pages.

(56) References Cited

OTHER PUBLICATIONS

Dreger et al.; "Dynamic Application-Layer Protocol Analysis for Network Intrusion Detection". Published in USENIX Security Symposium (Jul. 31, 2006), 16 pages.

* cited by examiner

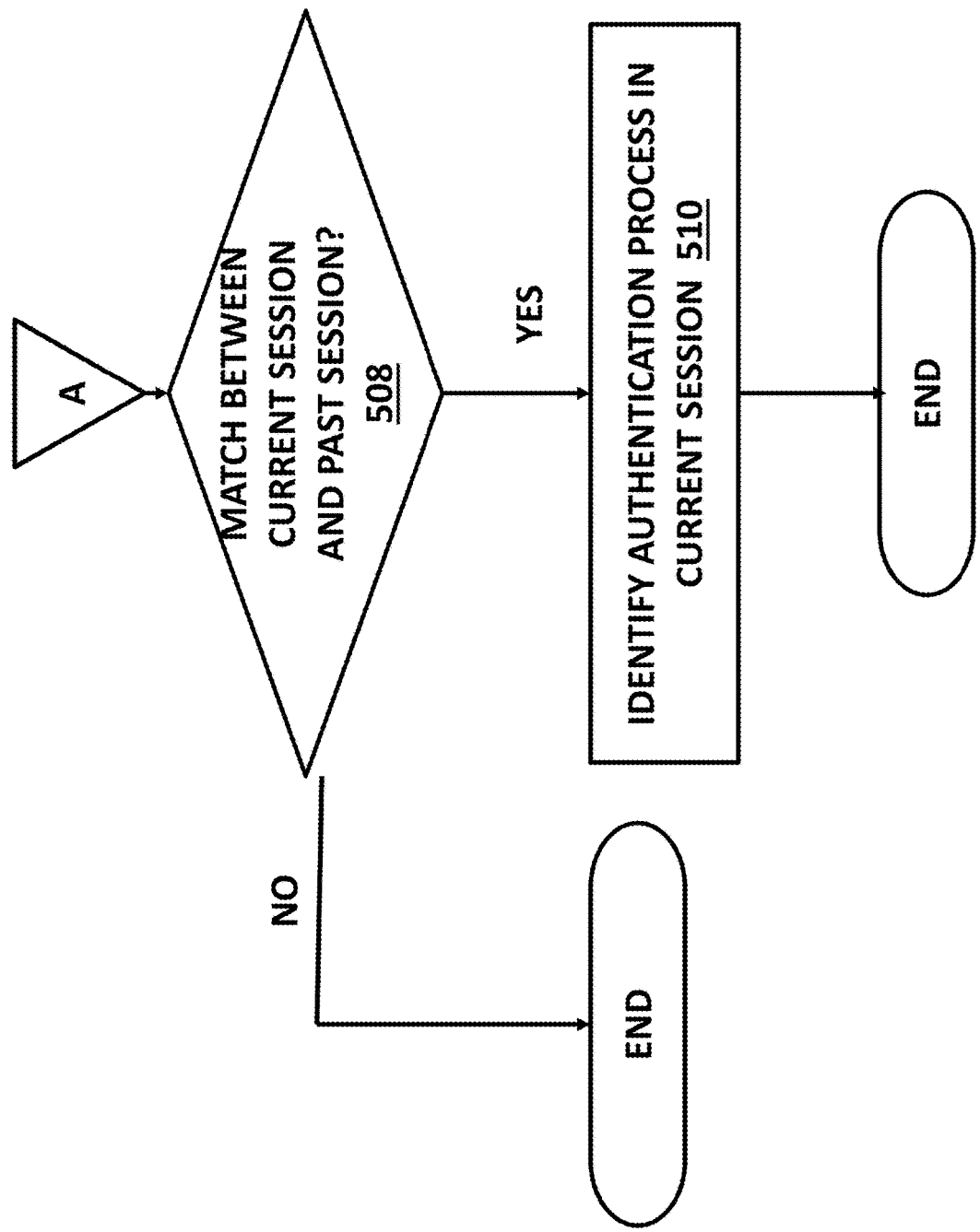

```
function find_first_neg(seq: vector of int, first: count &default=1): int
{
    local i: count = 0;
    for (idx in seq) {
        if (seq[idx] < 0) {
            i = i + 1;
            if (first == i) {
                return idx;
            }
        }
    }
    return -1;
}
```

FIGURE 6

```
function find_first_pos(seq: vector of int, first: count
&default=1): int {
    local i: count = 0;
    for (idx in seq) {
        if (seq[idx] > 0) {
            i = i + 1;
            if (first == i) {
                return idx;
            }
        }
    }
    return -1;
}
```

FIGURE 7

SYSTEM AND METHOD FOR IDENTIFYING AUTHENTICATION METHOD OF SECURE SHELL (SSH) SESSIONS

FIELD

The disclosure relates generally to identifying an authentication method for SSH sessions. The disclosed system and method may be used in several different technical fields including network security monitoring, incident response and network forensics and/or mis-use detection.

BACKGROUND

A computer network typically has one or more computer systems connected together by some type of communications path. Each computer system may execute one or more endpoint applications. For example, one type of endpoint application is a secure shell (SSH) server that can establish a SSH session with a client. These endpoint applications are capable of logging information about the connections they receive wherein the logged information may include the method of authentication being used for each connection. Conventional systems for logging information exists such as host based solutions. An example of a host based solution is a server log. However, host-based solutions come with their own set of technical problems and challenges. Those challenges may include how does an entity centralize logs across multiple servers and how does the entity ensure that the logs on a host have not been tampered with. Thus, host-based solution for logging information (and thus detecting an authentication method) lack a centralization mechanism and are insecure (since it cannot be guaranteed that tampering of the log did not occur) and have at least two technical problems that leave these solutions lacking.

It is desirable to be able to determine the method of client authentication being used in an SSH session that overcomes the above technical problems and limitations of known techniques including the known host based techniques described above and it is to this end that the disclosure is directed.

BRIEF DESCRIPTION OF THE DRAWINGS

FIGS. 5A and 5B illustrate a method for inferring an SSH authentication method;

FIG. 6 shows the pseudocode for a vector function that determines a negative element in a vector;

FIG. 7 shows the pseudocode for a vector function that determines a positive element in a vector;

DETAILED DESCRIPTION OF ONE OR MORE EMBODIMENTS

The disclosure is particularly applicable to an sensor appliance in a computer network that can identify an SSH authentication process for a particular SSH session using an inference process and it is in this context that the disclosure will be described. It will be appreciated, however, that the SSH process authentication identification process has greater utility since it can be implemented in other devices that can capture SSH data traffic and can identify the SSH authentication method.

The disclosed system and method provides a technical solution to the above technical problem in network traffic monitoring in which the system infers the method of authentication used in a known SSH session. Inferring the method of authentication from a network sensor provides an implicit centralization of authentication logs (addressing the technical problem with server logs set forth above). Additionally, inferences generated by the disclosed system and method are more difficult for an attacker to manipulate or tamper that addresses the other technical problem set forth above. The disclosed system and method may be used in various contexts including network security monitoring, incident response and network forensics and/or mis-use detection.

For the network security monitoring context, the determination of the authentication method may be used to ensure only approved authentication methods are used in accordance with a network's policy. For example, critical systems often require two-factor authentication (2FA). If a critical system is accessed via SSH and the client did not use 2FA, a system administrator could be alerted to the policy violation within seconds of it occurring.

For the incident response context, the authentication methods used in SSH sessions are logged once identified (using the method and system disclosed) and a forensic investigation is provided additional contextual information which could prove useful. The use case is essentially the same as "network security monitoring" but in a historic capacity instead of a real-time one.

For the mis-use detection context, like the network security monitoring context, the policy violation for the incorrect authentication method can be identified that may indicate mis-use of the computer network resources.

Figure 1:
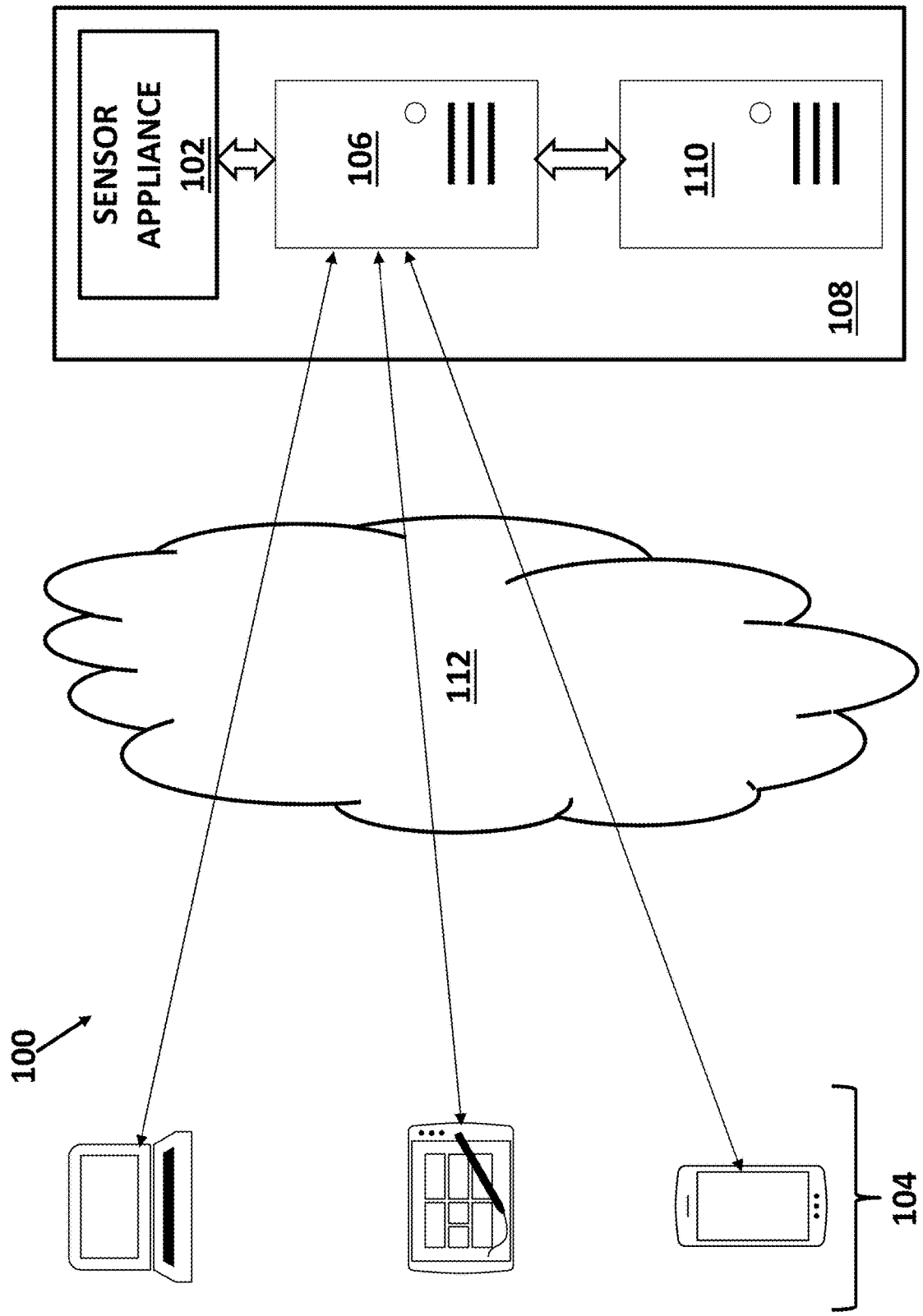
FIG. 1 illustrates a typical computer network that implements secure shell (SSH) connections that includes a sensor appliance.

FIG. 1 illustrates a typical computer network 100 that implements secure shell (SSH) connections that includes a sensor appliance 102 that can infer the authentication method for each SSH session. In other embodiments, the ability to infer an SSH authentication method for an SSH session without host logs may be included in other types of sensors or devices in which the data being communicated in the SSH session may be captured and analyzed. An SSH connection may be established between each client 104 and an SSH server 106 in a computer system or network 108. The SSH server 106 may be positioned before other servers and computer systems 110 in the computer system or network 108 to protect the other servers and computer systems 110 in the computer system or network 108. In the example in FIG. 1, each client may be executed on various computing resources such as a laptop computer, a tablet computer, a smartphone device (examples being shown in FIG. 1) or any other processor based computing system or device.

As shown, each SSH connection/session may be established over a communications path 112 between each client and the SSH server 106. In the system shown in FIG. 1, the sensor appliance 102 may capture the data being transferred during the SSH session and infer the authentication method as described in more detail below. The sensor appliance 102 may have at least a processor and memory and input/output ports that allow the sensor appliance 102 to intercept/capture the SSH data traffic. In addition, as shown and described below, the sensor appliance 102 may include an SSH inference module (preferably implemented as a plurality of instructions or computer code stored in memory and executed by the processor of the sensor appliance) that perform a SSH authentication method identification process as described below in more detail.

Figure 2:
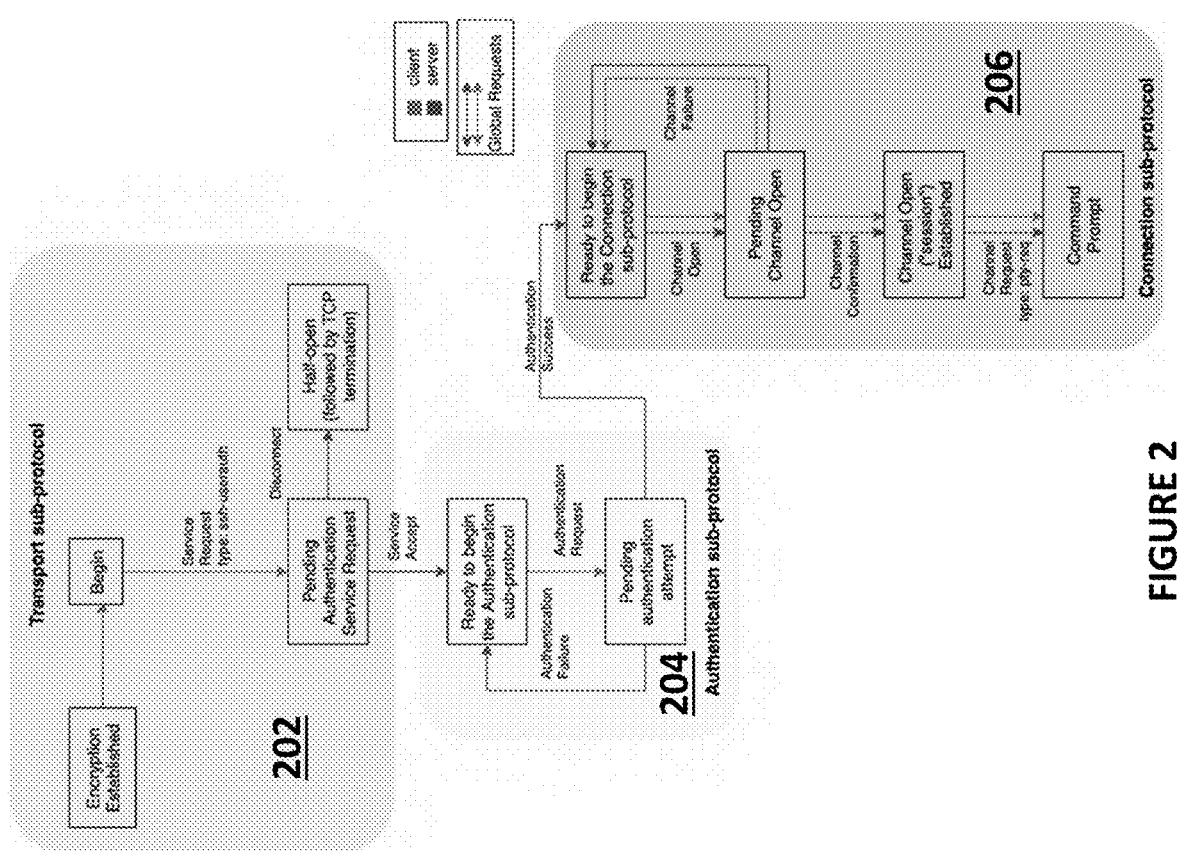
FIG. 2 illustrates a set of known sub-protocols of a known SSH session.

FIG. 2 illustrates a set of known sub-protocols of a known SSH session. In particular, each SSH session may consist of a cleartext handshake negotiations of the protocol (not shown in FIG. 2) and may then have a transport sub-protocol 202, an authentication sub-protocol 204 and a connection sub-protocol 206 wherein the connection/session transitions between the various sub-protocols as shown in FIG. 2. The various data in the sub-protocols are exchanged using a plurality of protocol data units (PDUs) wherein each PDU may be known as a message. Furthermore, one or more messages are formatted in a well-known SSH packet structure. For purposes of this disclosure, the authentication sub-protocol 204 will be focused on during which a particular authentication process is used. An authentication success results in the process transitions the protocol to the connection sub-protocol 206 as shown.

In the authentication sub-protocol 204, SSH permits the use of a number of different authentication methods. The authentication methods may include: 1) a password (use a password for authentication); 2) public-key (using public-key authentication); 3) keyboard-interactive that is designed to allow the Secure Shell client to support several different types of authentication methods; 4) Generic Security Service Application Programming Interface (GSSAPI) that is a common security service interface that allows different security mechanisms to be used via one interface; 5) SecurID (legacy) that requires that the user have a SecurID device that generates the numeric codes that are needed to log in and this legacy method is supported for interoperability reasons; and 6) use Pluggable Authentication Module (PAM) that is legacy method and gained wide popularity especially on Unix platforms that is supported for interoperability reasons. The default authentication methods are GSSAPI, public-key authentication, Keyboard-Interactive, and password authentication.

In addition, if the public-key authentication method is selected, there are a number of different public-key authentication specific processes that may be selected and used during the SSH session/communication. The public-key process may be selected from: 1) using SSH Accession Certificates in which SSH Accession certificates are used for authentication; 2) using SSH Accession Keys for authentication and SSH Accession Lite offers an easy method for accessing authentication credentials on smart cards and other hardware tokens; 3) using PKCS #11 Certificates in which certificates may be stored for example on a smart card or a USB token; 4) using PKCS #11 Keys that may be stored for example on a smart card or a USB token; 5) using User Certificates; and/or 6) using User Keys for authentication. In view of the above possible different SSH authentication methods for each SSH session, it is desirable to be able to identify the authentication method/process being utilized for a particular SSH session and the disclosed system and method infers the authentication method/process without host logs.

Figure 3:
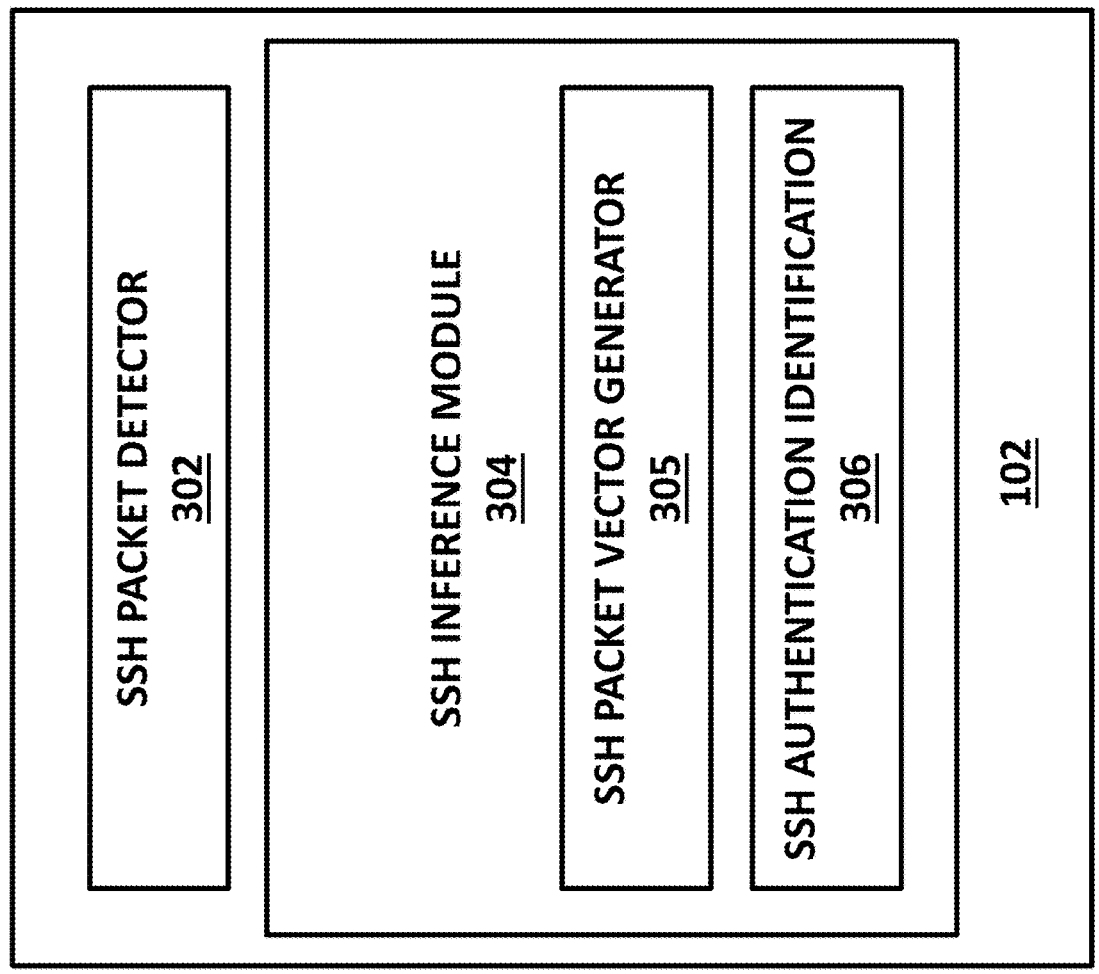
FIG. 3 illustrates more details of the SSH authentication identifier within the sensor appliance in one embodiment.

FIG. 3 illustrates more details of the SSH authentication identifier within the sensor appliance 102 for the embodiment of the system 100 in FIG. 1. It is understood that the SSH authentication identifier system and method may also be implemented on/in other devices/systems that can capture/receive the SSH data traffic and those other implementations are within the scope of the disclosure. Using the SSH authentication identifier, the system and method infer a method of authentication used by an SSH client to authenticate to an SSH server, also called a "host". While this identification of authentication method is easy for a small system, in a large environment, issues can arise with auditing endpoints individually. Additionally, if endpoint systems are compromised by an attacker, the integrity of their logs are also compromised. Thus, inferring the method of authentication from a passive network sensor (the sensor appliance 102) provides a "ground truth" about the method of authentication which does not rely on potentially misleading host logs and provides a centralized location for examining authentications that thus addresses the technical problems of the known systems. The SSH authentication identifier thus allows for increased auditability of SSH connections at a single network sensor location instead of the requirement of visibility on all (potentially untrustable) endpoints. In one use case of the system and method, a network administrator can to audit client authentications to SSH servers without examining the servers directly and without compromising the encryption of the SSH session.

For the embodiment in which the SSH authentication identifier is within the sensor appliance 102 and executed by the processor of the sensor appliance 102, the sensor appliance 102 may include a SSH packet detector 302 that can capture the SSH data traffic as is well known. The sensor appliance 102 may also have an SSH inference module 304 that receives the SSH data traffic and identifies a particular authentication method for each SSH session based on inferences from the SSH data traffic as described in more detail below. The SSH inference module 304 further has a SSH packet vector generator 305 that generates a vector (shown and described in more detail with respect to FIGS. 4A-4D below) and a SSH authentication identifier 306 that uses the generated vector to detect communication patterns in the current SSH session data and then to infer the authentication method for the current SSHE session data as described below with reference to FIGS. 5A and 5B. Each of the elements/modules of the sensor appliance 102 may be implemented in hardware as one or more hardware devices and/or a plurality of instructions/computer code that are executed by the processor of the sensor appliance 102.

Figure 4A:
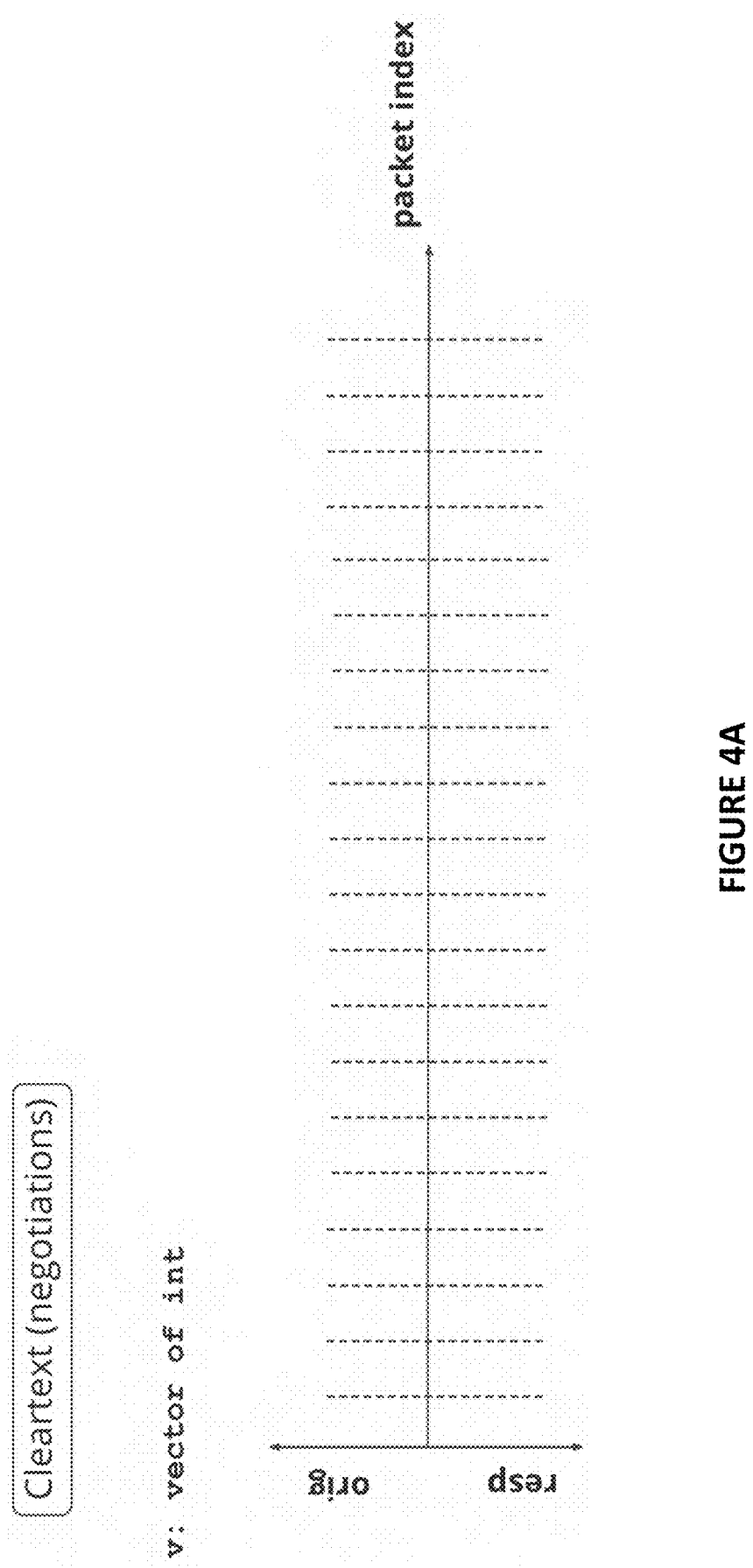
FIGS. 4A-4D illustrate an example of the messages captured/received from a SSH session.

FIGS. 4A-4D illustrate an example of the messages captured/received from a SSH session. Using the SSH packet vector generator 305, a current SSH session may be transformed into a vector of integers (as shown in FIG. 4A) in a packet index. By encoding SSH packet lengths into a vector, a TCP connection carrying an SSH session can be represented by a sequence of signed integers. These sequences are a method of encoding communication patterns between two endpoints, an SSH client and an SSH server, also referred to as a "host". In one embodiment, the encoding used for the vector is that a length of each packet in the SSH data traffic is transformed into an integer (for example, a positive (+) integer value for a packet length from the client/originator and a negative (−) integer value for a packet length from the server/responder.) In the vector, an order of the sequences is preserved using the vector indexes.

Figure 4B:
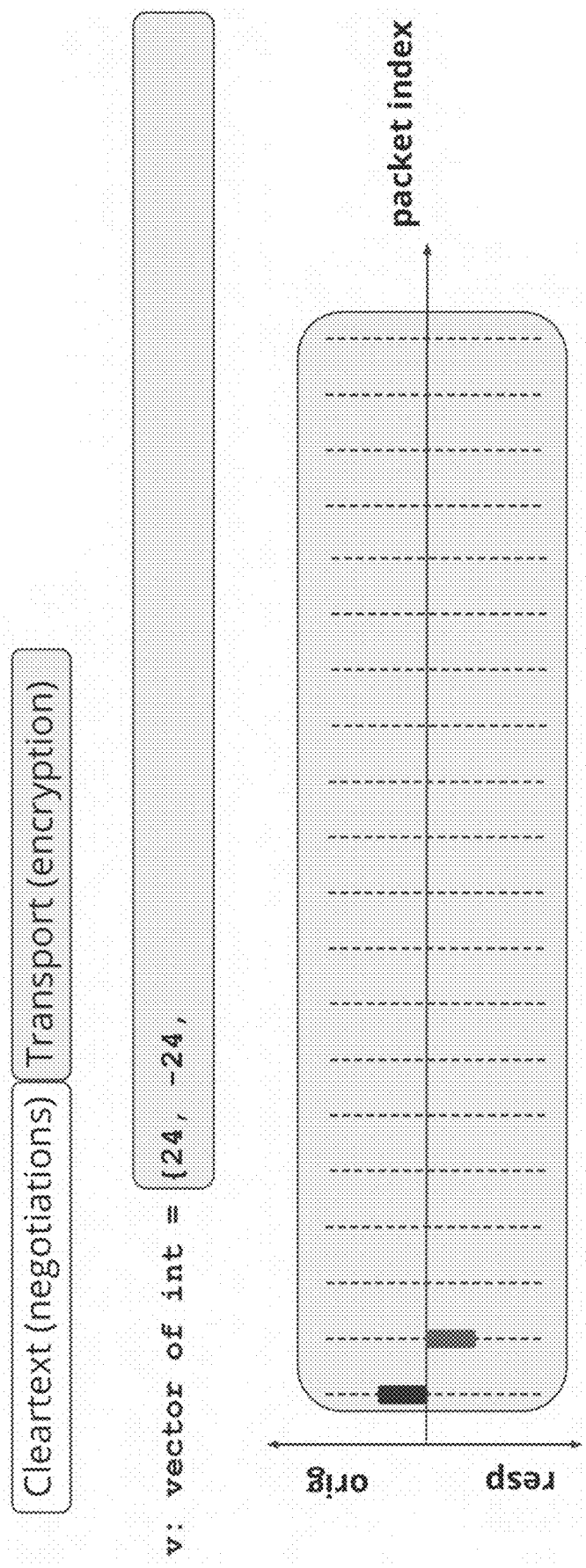
Figure 4C:
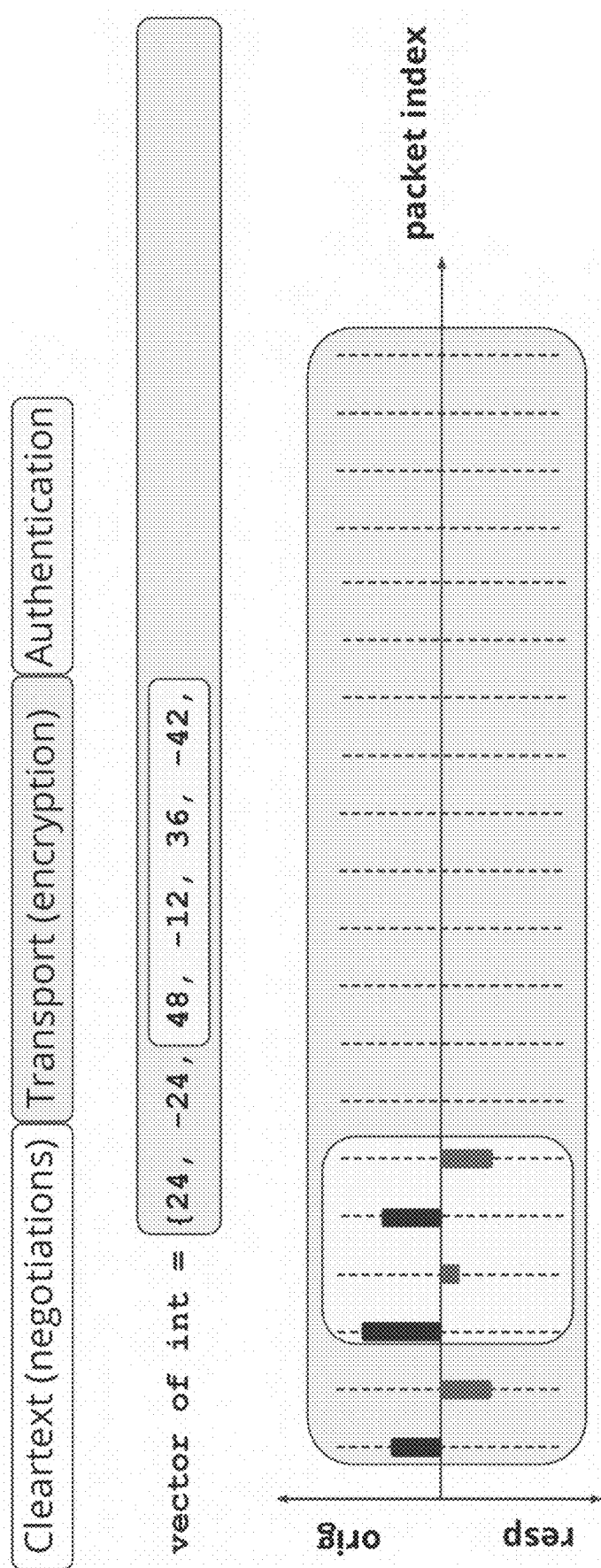
Figure 4D:
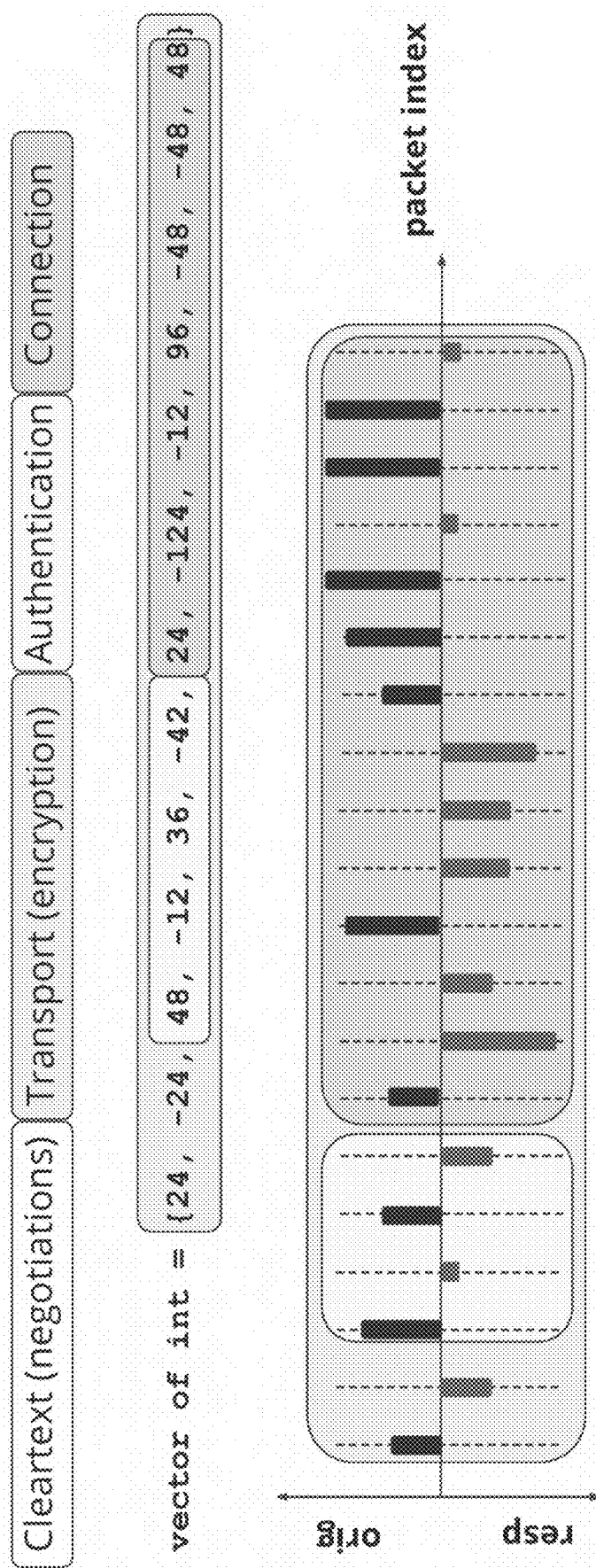

As shown in FIG. 4A, during the cleartext negotiation process no packets are stored in the vector of integers. From the transport sub-protocol, two integers are generated for the vector as shown in FIG. 4B. From the authentication sub-protocol, four integers are generated for the vector as shown in FIG. 4C. Then, from the connection sub-protocol, a plurality of integers are stored in the vector as shown in FIG. 4D. The vector for these sub-protocols may be part of the capturing of the data packets from the SSH session.

In the SSH sub-protocols shown in FIGS. 4A-4D, the SSH data may have one or more communication patterns that may be used to infer the authentication method as discussed in more detail below. For each sequence of packets, the one or more communication patterns may be based on the following observables of the SSH data: 1) message lengths, or sizes—the size of a message being sent from one endpoint to another; 2) message ordering—the order of the messages exchanged between the endpoints (client and server for example); 3) message timing—the interarrival deltas between messages transmitted/received; and/or 4) message directionality—which endpoint sent the message and which endpoint received the message. The above observables are from the perspective of a passive network sensor with a vantage point "between" the two endpoints so that the system and method do not rely on a log that may be corrupted/hacked and that may only show the communication from the perspective on one endpoint. For example, a message carrying a public key will often be larger in size than a message carrying a password and is an example of the message size observable. As another example, a None type of authentication typically happens at the very beginning of the authentication process and is thus example of the message ordering observable. As another example, an automated password authentication attempt (where a client provides a password automatically) will not contain a pause between the exchange of SSH messages while an interactive password authentication attempt (where a client prompts a user to type their password interactively) will pause thus showing the message timing observable. Finally, an authentication attempt messages will always be sent by the client to the server and authentication result messages will always be sent from the server to the client which are examples of the message directionality observable.

While FIGS. 4A-4D illustrate a length of packet as the communication pattern, each of the other communication patterns or more than one of the communication patterns may be identified in a SSH session data. Each different authentication method of the SSH session can be inferred from one or more of these communication patterns.

Figure 5A:
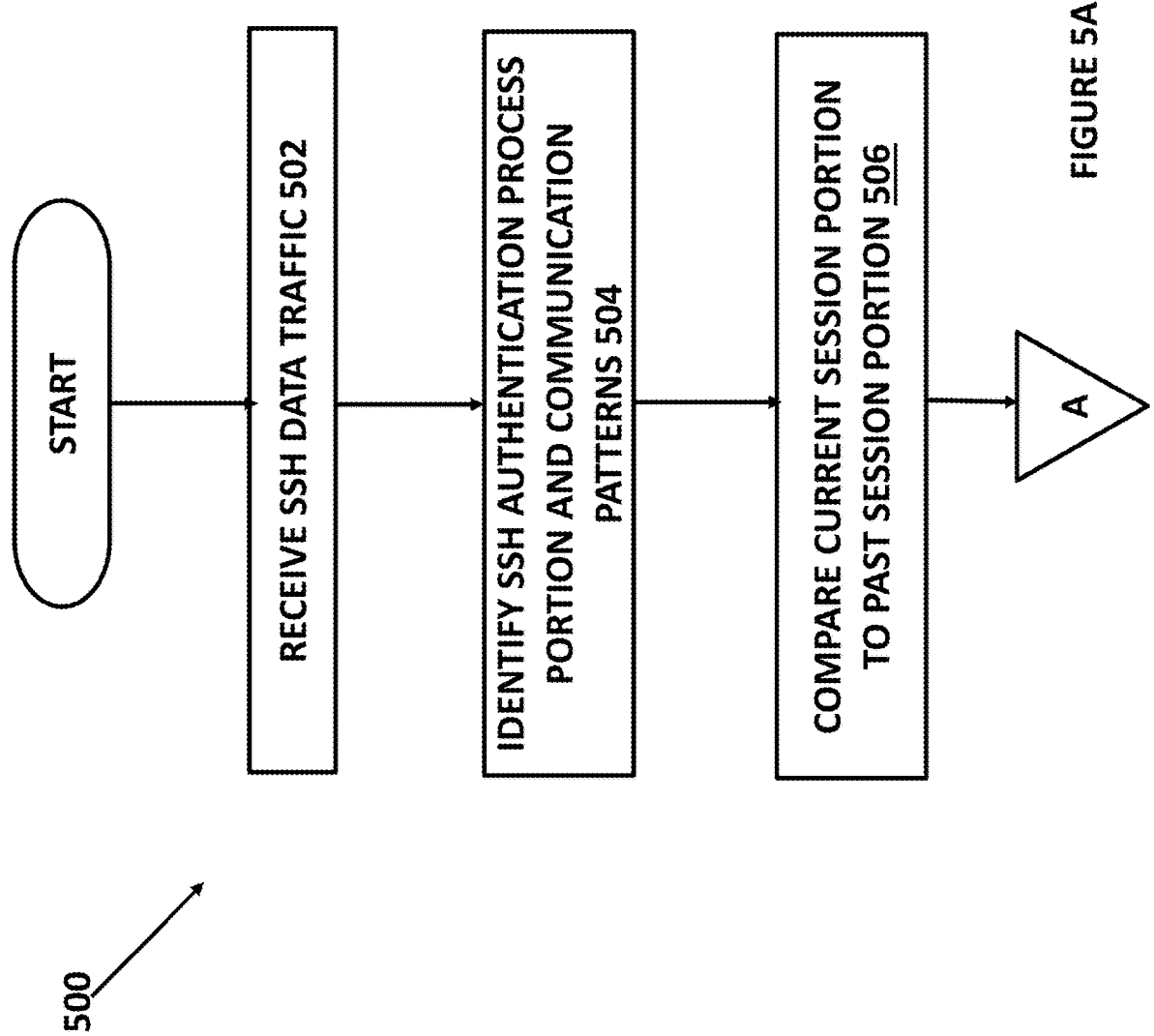

FIGS. 5A and 5B illustrate a method 500 for inferring an SSH authentication method. This method can be carried out by the sensor appliance 102 in FIG. 1, but may also be carried out using other systems in which it is desirable to identify the authentication method for an SSH session. The method 500 receives the SSH data traffic 502 and the SSH data traffic may be encoded into the vector as described above. Once an SSH session is encoded as the vector, the SSH authentication identifier 306 shown in FIG. 3 may scan vectors for specific patterns indicative of specific uses of a protocol. In the case of SSH authentication methods, vector patterns relating to authentication appear between the transport and connection subprotocols of SSH as discussed above.

During the scanning of the vector(s) of the current SSH session, the method may identify the SSH authentication portion of the SSH data traffic as shown above and generate the communication pattern(s) that characterize the SSH authentication portion of the SSH data traffic. Using the vector that has been generated, one or more vector operations may be used to generate the communication pattern(s) and thus infer the authentication method for the current SSH session. For example, the method use index slicing (heads and tails), summary statistics, such as maximum, minimum, mean, range, etc.), runs and a predetermined number of occurrences (first, second, third, etc.) of a positive integer, a negative integer or a run of integers. The runs may include runs of increasing integers, runs of decreasing integers and/or runs of repeating integers.

Two examples of the vector operations are shown in FIGS. 6 and 7 where FIG. 6 shows the pseudocode for a vector function that determines a negative element in a vector and FIG. 7 shows the pseudocode for a vector function that determines a positive element in a vector. In these examples, a negative element represents a length of a message sent by the SSH server while a positive element represents a length of a message sent by the client. These vector operations/function and other functions are used to generate the communication pattern(s) in the vector that can be used to identify the SSH authentication method as show in FIGS. 5A and 5B above.

The method 500 may have, for prior SSH sessions with known authentication methods or discovered authentication methods, generated one or more communication pattern(s) that identify each of the authentication method in each prior SSH session in each authentication sub-protocol. These known communication pattern(s) that identify the authentication method for each prior SSH session may be stored. Furthermore, as new communication pattern(s) are found that identify an SSH authentication method, those new communication pattern(s) and identified SSH authentication method are also stored.

Using the communication pattern(s) for the current SSH session and the store of known communication pattern(s) that identify the authentication method for each prior SSH session, the method may compare (506) the current session (and its communication patterns) to the prior SSH sessions (and their communication pattern(s) that identify the authentication method for each prior SSH session). The method may then determine if there is an exact match between the communication pattern(s) of the current SSH session and the communication pattern(s) of a particular prior SSH session (508).

If there is a match, then the method can infer (510) that the authentication method used for the current SSH session is the same authentication method as used in the particular prior SSH session. Thus, the method is able to infer the SSH authentication method from the communication patterns of the SSH data traffic. This technical solution solves the technical problems of the known systems and does not require trying to brute force crack the encryption which is time consuming.

Figure 8A:
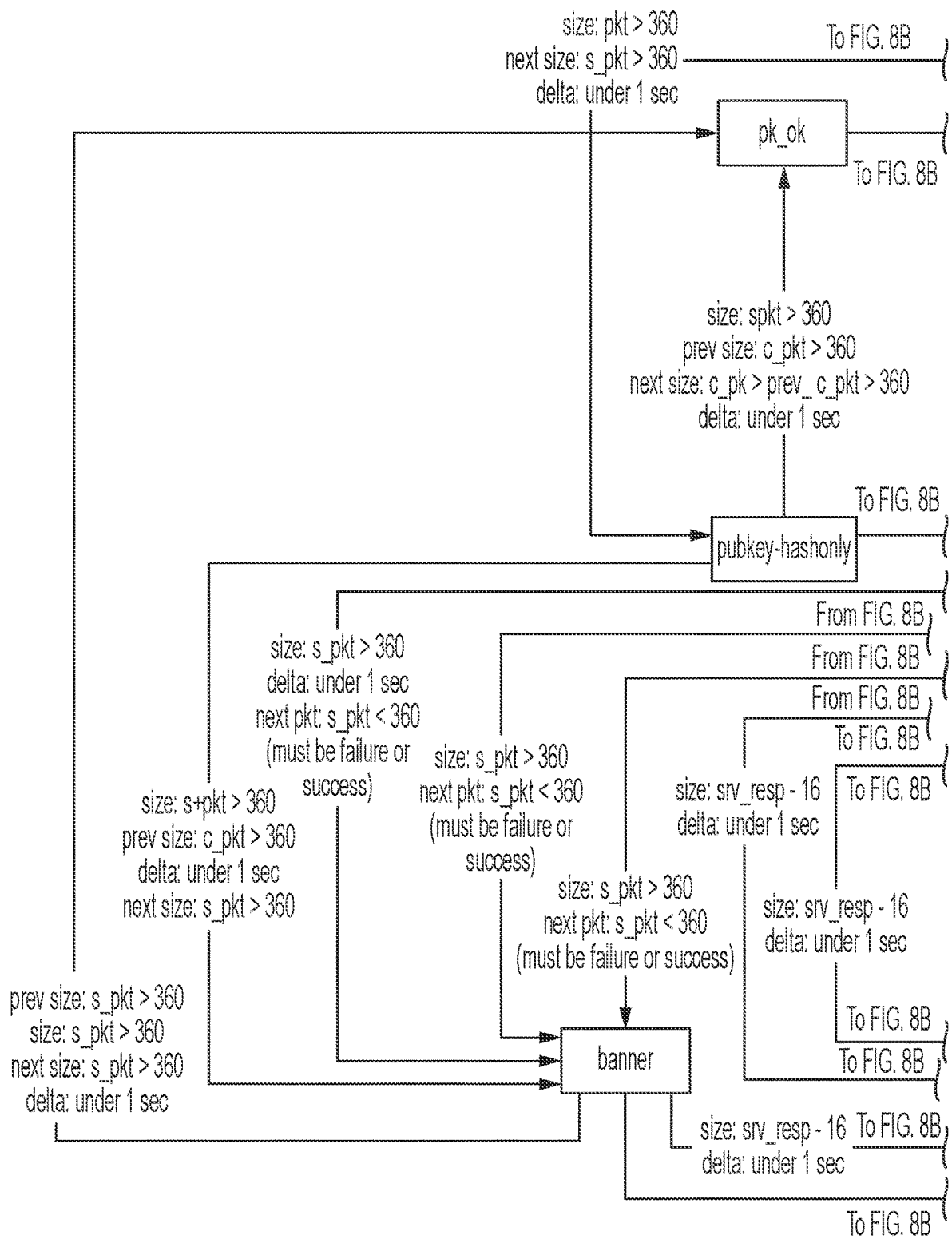
FIGS. 8A-8C illustrate the SSH authentication state machine.
Figure 8B:
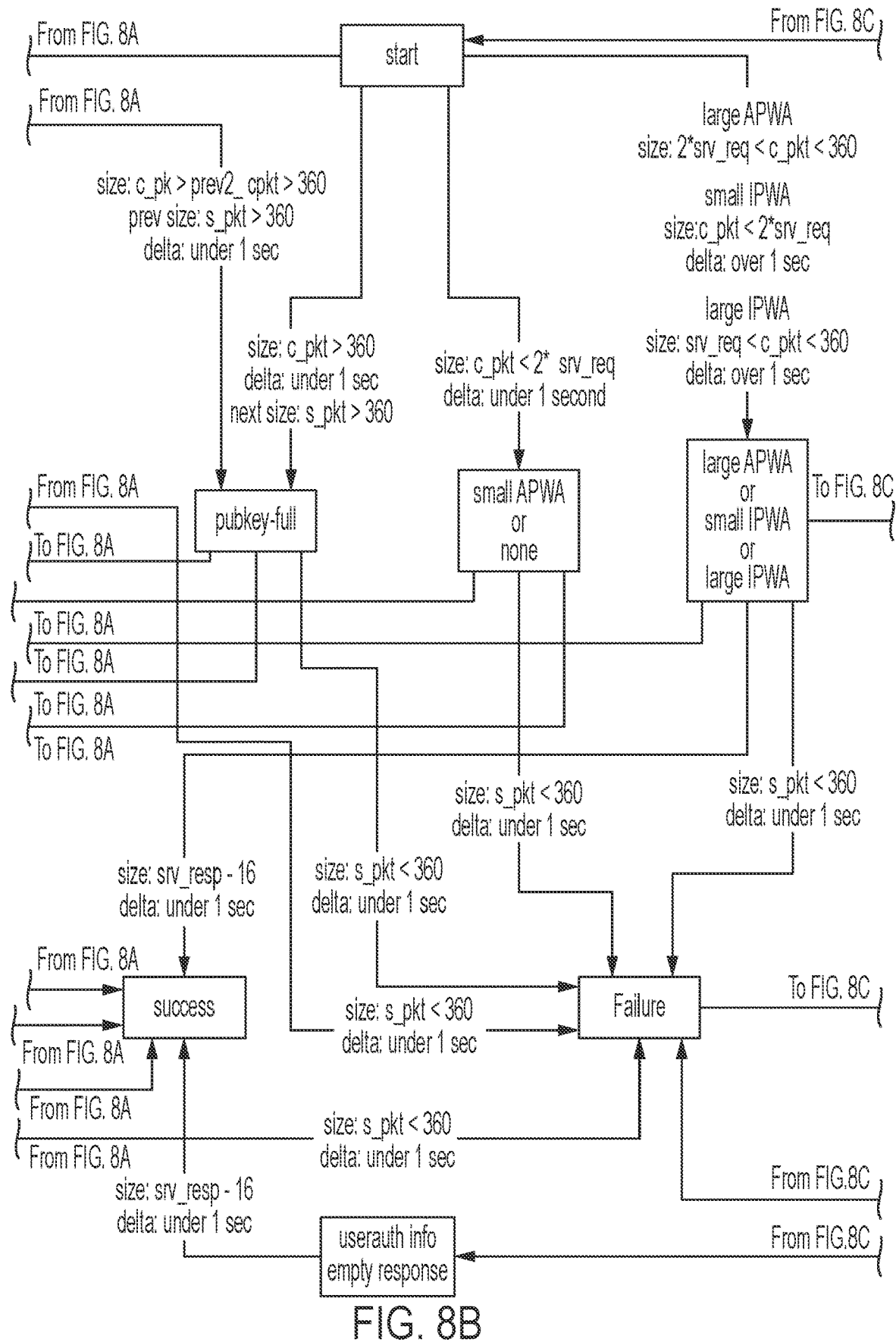
Figure 8C:
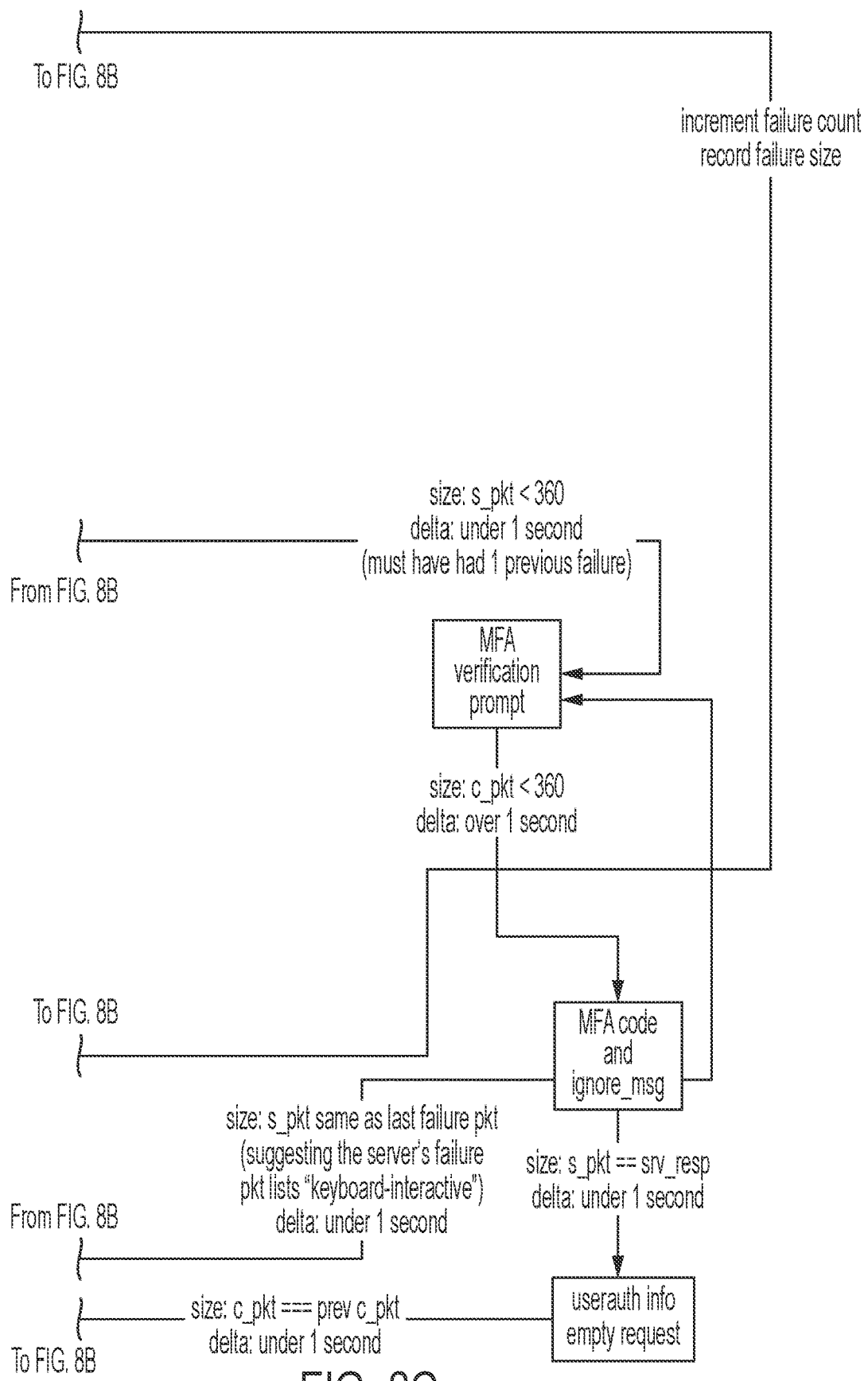

FIGS. 8A-8C illustrate the SSH authentication state machine. The state machine shows the characteristics of the data packet(s) for each interaction/data packet between the SSH server and a client, such as pubkey-hash only state on the client that communicates data packet(s) to the SSH server. Thus, for this exemplary interaction, the characteristics of the data packet are that it has a size>360 for the server destined packet, a size>360 for the previous client packet, a size of the next packet>previous client>360 and that the delta is under 1 second. Each interaction has its own data packet characteristics that can be determined using the communication pattern(s) thus enabling the inferring of the SSH authentication method.

Figure 9:
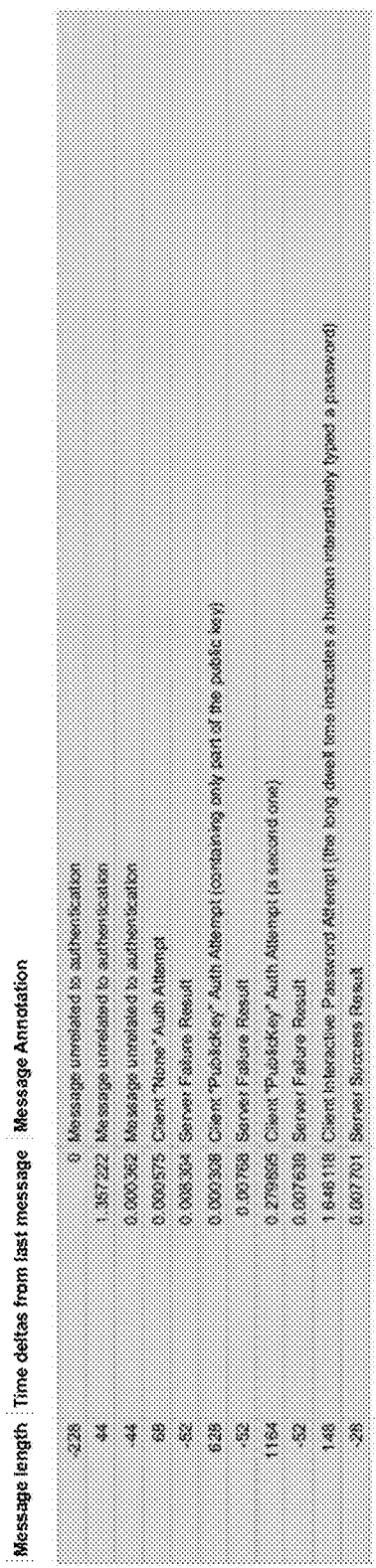
FIG. 9 illustrates a first example of the SSH packets and the authentication method inferred from the SSH packets.
Figure 10:
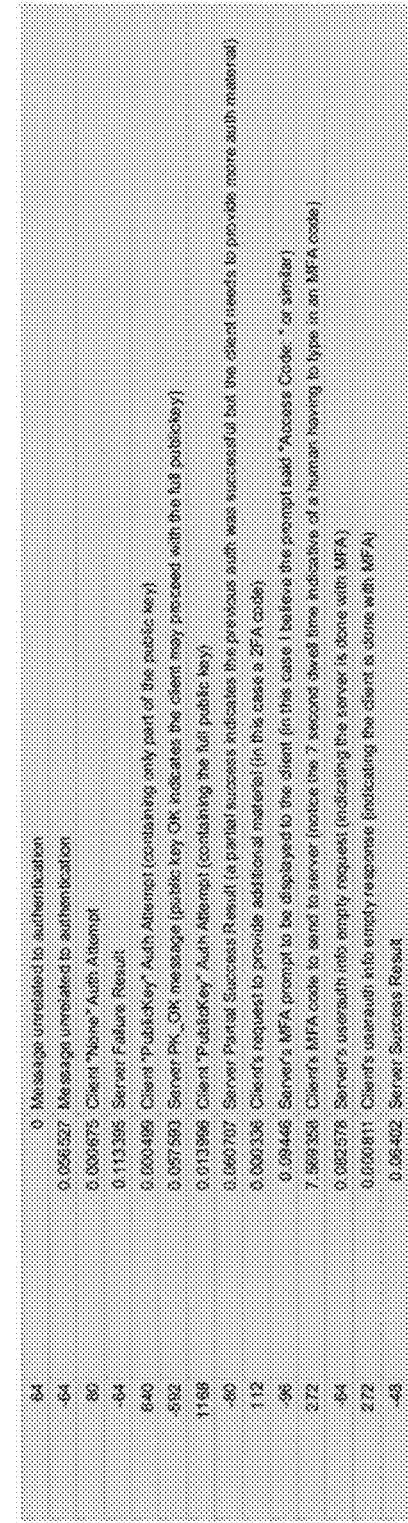
FIG. 10 illustrates a second example of the SSH packets and the authentication method inferred from the SSH packets.

FIG. 9 illustrates a first example of the SSH packets and the authentication method inferred from the SSH packets and FIG. 10 illustrates a second example of the SSH packets and the authentication method inferred from the SSH packets. In these two examples, the data packet values are shown a first column (−228 or 64 for example), a time delta from last message in a middle column and comments about each data packet in a third column. The comments show how the message length and delta of each data packet (in combination with the SSH authentication state machine) are used to infer information about the authentication method which are then in turn used to infer the SSH authentication used in each case.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the disclosure or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosure, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the system and method have been specifically described herein, it will be apparent to those skilled in the art to which the system and method pertains that variations and modifications of the various implementations shown and described herein may be made without departing from the spirit and scope of the system and method. Accordingly, it is intended that the disclosure be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A method, comprising:
receiving, by a processor, secure shell (SSH) data traffic for a current session between a first endpoint and a second endpoint;
identifying, by the processor, at least one communication pattern in a portion of the current SSH data traffic that implements an SSH authentication process, the at least one communication pattern including a size of each packet in the SSH authentication process between the first and second endpoints, a direction of each packet in the SSH authentication process between the first and second endpoints and an interarrival delta between each packet and a prior packet in the SSH authentication process between the first and second endpoints;
comparing, by the processor, the at least one communication pattern of the SSH authentication process portion to a communication pattern of a stored SSH authentication process portion being an authentication process portion from a past SSH session wherein the communication pattern of the authentication process portion from the past SSH session indicates a specific SSH authentication method selected from a plurality of authentication methods; and
inferring, by the processor, a particular SSH authentication method used for the current session of the SSH data traffic between the first and second endpoints as the specific selected SSH authentication method based on a match of the at least one communication pattern of the current session SSH authentication process portion and the communication pattern of the past SSH session.

2. The method of claim 1 further comprising encoding, by the processor, the current session SSH data traffic into a vector and identifying, by the processor, the at least one communication pattern in the vector.

3. The method of claim 2, wherein the vector further comprises a sequence of signed integers.

4. The method of claim 3, wherein each signed integer is a length of a packet in the SSH session.

5. The method of claim 4, wherein the vector further comprises a positive integer value for a packet length from a client in the SSH session and a negative integer value for a packet length from a server in the SSH session.

6. The method of claim 1, wherein comparing the at least one communication pattern further comprises comparing, by the processor, the at least one communication pattern of the current SSH session to a plurality of stored prior SSH sessions that each have one or more communication patterns and a known authentication method.

7. The method of claim 2, wherein the at least one communication pattern further comprises one of a size of a packet in the vector, an order of the packets in the vector, a timing between packets in the vector and a direction of a packet in the vector.

8. The method of claim 1 further comprising capturing, by a sensor appliance that includes the processor, the SSH data traffic for the current session.

9. The method of claim 1, wherein the plurality of authentication methods further comprises a password authentication, a public key authentication, a keyboard interactive authentication, a general security service application programming interface authentication, a secureID authentication and a pluggable authentication module authentication.

10. An apparatus, comprising:
a processor;
a memory;
a plurality of lines of instructions stored in the memory and executed by the processor that configure the processor to:
receive secure shell (SSH) data traffic for a current session between a first endpoint and a second endpoint;
identify at least one communication pattern in a portion of the current SSH data traffic that implements an SSH authentication process, the at least one communication pattern including a size of each packet in the SSH authentication process between the first and second endpoints, a direction of each packet in the SSH authentication process between the first and second endpoints and an interarrival delta between each packet and a prior packet in the SSH authentication process between the first and second endpoints;
compare the at least one communication pattern of the SSH authentication process portion to a communication pattern of a stored SSH authentication process portion being an authentication process portion from a past SSH session wherein the communication pattern of the authentication process portion from the past SSH session indicates a specific SSH authentication method selected from a plurality of authentication methods; and
infer a particular SSH authentication method used for the current session of the SSH data traffic between the first and second endpoints as the specific selected SSH authentication method based on a match of the at least one communication pattern of the current session SSH authentication process portion and the communication pattern of the past SSH session.

11. The apparatus of claim 10, wherein the processor is further configured to encode the current session SSH data traffic into a vector and to identify the at least one communication pattern in the vector.

12. The apparatus of claim 11, wherein the vector further comprises a sequence of signed integers.

13. The apparatus of claim 12, wherein each signed integer is a length of a packet in the SSH session.

14. The apparatus of claim 13, wherein the vector further comprises a positive integer value for a packet length from a client in the SSH session and a negative integer value for a packet length from a server in the SSH session.

15. The apparatus of claim 10, wherein the processor is further configured to compare the at least one communication pattern of the current SSH session to a plurality of stored prior SSH sessions that each have one or more communication patterns and a known authentication method.

16. The apparatus of claim 11, wherein the at least one communication pattern further comprises one of a size of a packet in the vector, an order of the packets in the vector, a timing between packets in the vector and a direction of a packet in the vector.

17. The apparatus of claim 10, wherein the plurality of authentication methods further comprises a password authentication, a public key authentication, a keyboard interactive authentication, a general security service application programming interface authentication, a secureID authentication and a pluggable authentication module authentication.

18. A sensor appliance, comprising:
a processor;
a memory;
a plurality of lines of instructions stored in the memory and executed by the processor that configure the processor to:
capture secure shell (SSH) data traffic for a current session between a first endpoint and a second endpoint;
identify at least one communication pattern in a portion of the current SSH data traffic that implements an SSH authentication process, the at least one communication pattern including a size of each packet in the SSH authentication process between the first and second endpoints, a direction of each packet in the SSH authentication process between the first and second endpoints and an interarrival delta between each packet and a prior packet in the SSH authentication process between the first and second endpoints;
compare the at least one communication pattern of the SSH authentication process portion to a communication pattern of a stored SSH authentication process portion being an authentication process portion from a past SSH session wherein the communication pattern of the authentication process portion from the past SSH session indicates a specific SSH authentication method selected from a plurality of authentication methods; and
infer a particular SSH authentication method used for the current session of the SSH data traffic between the first and second endpoints as the specific selected SSH authentication method based on a match of the at least one communication pattern of the current session SSH authentication process portion and the communication pattern of the past SSH session.

19. The appliance of claim 18, wherein the processor is further configured to encode the current session SSH data traffic into a vector and to identify the at least one communication pattern in the vector.

20. The appliance of claim 19, wherein the vector further comprises a sequence of signed integers.

21. The appliance of claim 20, wherein each signed integer is a length of a packet in the SSH session.

22. The appliance of claim 21, wherein the vector further comprises a positive integer value for a packet length from a client in the SSH session and a negative integer value for a packet length from a server in the SSH session.

23. The appliance of claim 18, wherein the processor is further configured to compare the at least one communication pattern of the current SSH session to a plurality of stored prior SSH sessions that each have one or more communication patterns and a known authentication method.

24. The appliance of claim 19, wherein the at least one communication pattern further comprises one of a size of a packet in the vector, an order of the packets in the vector, a timing between packets in the vector and a direction of a packet in the vector.

25. The sensor apparatus of claim 18, wherein the plurality of authentication methods further comprises a password authentication, a public key authentication, a keyboard interactive authentication, a general security service application programming interface authentication, a secureID authentication and a pluggable authentication module authentication.

* * * * *